July 10, 1951 L. E. NORTON 2,560,365

FREQUENCY STABILIZATION OF OSCILLATORS

Filed Oct. 22, 1949 3 Sheets-Sheet 1

INVENTOR
Lowell E. Norton
BY J. L. Whittaker
ATTORNEY

July 10, 1951 L. E. NORTON 2,560,365

FREQUENCY STABILIZATION OF OSCILLATORS

Filed Oct. 22, 1949 3 Sheets-Sheet 2

INVENTOR
Lowell E. Norton
BY J. L. Whittaker
ATTORNEY

INVENTOR
Lowell E. Norton
BY J. L. Whittaker
ATTORNEY

Patented July 10, 1951

2,560,365

UNITED STATES PATENT OFFICE 2,560,365

FREQUENCY-STABILIZATION OF OSCILLATORS

Lowell E. Norton, Princeton, N. J., assignor to Radio Corporation of America, a corporation of Delaware Application October 22, 1949, Serial No. 122,938

21 Claims. (Cl. 250—36)

This invention relates to methods of and systems for stabilization of the frequency of oscillators, particularly micro-wave oscillators such as klystrons, magnetrons and the like.

In accordance with the invention, upper and lower sidebands produced by modulation of the oscillator to be stabilized are beat against a cyclically varying low frequency to produce two sweeping sidebands which pass in opposite directions through the standard frequency in each sweep cycle. The difference, in the sweep cycle, between the times at which the standard frequency is swept by the two sidebands is a precise measure of the frequency deviation of the oscillator and is utilizable for control of the oscillator frequency.

More specifically, the sweeping sidebands are impressed upon high-Q circuit devices or elements resonant at the standard frequency which either may be the desired operating frequency of the oscillator or a frequency offset therefrom to prechosen extent. Voltage envelopes of the frequency swept high-Q devices are demodulated for impression upon the input circuits of a phase-comparator or coincidence detector whose output voltage is utilized or utilizable for control of the oscillator frequency. For stabilization of microwave oscillators, the high-Q devices comprise confined bodies of gas exhibiting sharp molecular resonance at a desired standard frequency.

The invention further resides in methods and systems having novel and useful features hereinafter described and claimed.

For a more detailed understanding of the invention, reference is made to the accompanying drawings in which.

Similar reference characters are applied to similar elements throughout the drawings.

Figures 1, 2A, 2B, 2C, 3, 3A, 3B, 3C, 6:
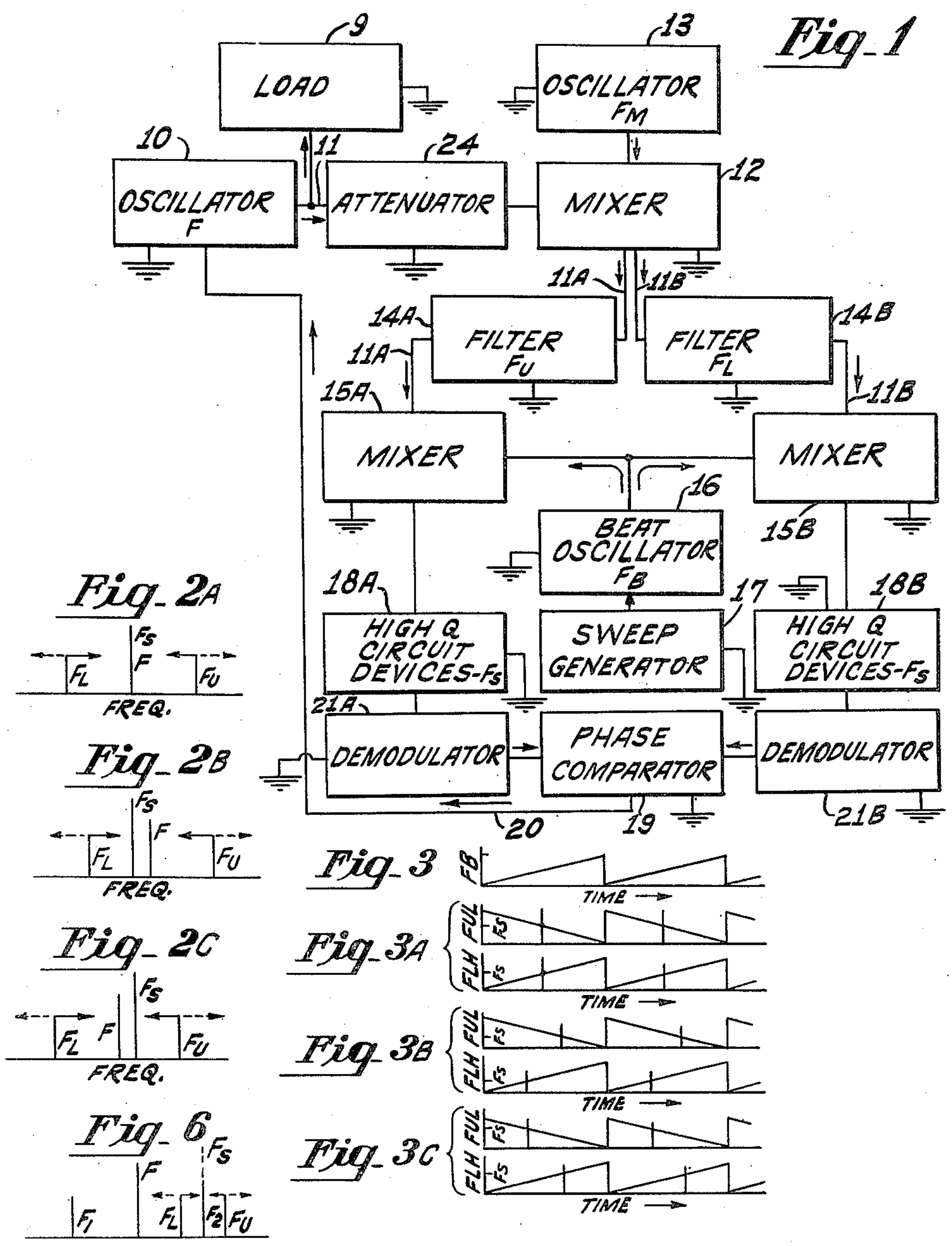
Figure 1 is a block diagram of a frequency-stabilizing system.
Figures 2A–2C and Figures 3 and 3C are explanatory figures referred to in discussion of Fig. 1 and other figures.
Figure 6 is an explanatory figure referred to in discussion of Figures 4 and 5.

Referring to Figure 1, at least a portion of the output of the oscillator 10 to be stabilized is impressed upon a mixer 12 upon which there is also impressed the low-frequency output of an oscillator or other low frequency source 13, thus to produce upper and lower sidebands $F_U$ and $F_L$ respectively. When the oscillator 10 supplies power to an antenna or other load generically represented by block 9, an attenuator 24 should be interposed between mixer 12 and the load to avoid undesired modulation of that portion of the oscillator output supplied to the load and not used as hereinafter described for frequency-stabilization purposes. The output circuit of the mixer 12 is divided into two paths, respectively including filters 14A and 14B, which selectively transmit the sidebands. Specifically, the filter 14A may pass the upper sideband $F_U$ to the exclusion of the lower sideband $F_L$, and conversely, the filter 14B passes the lower sideband $F_L$ to the exclusion of the upper sideband $F_U$. The outputs of the filters 14A, 14B, or equivalent frequency-selective circuits or devices, are respectively impressed upon the mixers 15A and 15B upon which is impressed a relatively low frequency $F_B$ which is cyclically varied by a mechanical or electrical modulator of any suitable type generically represented by sweep frequency generator 17. Preferably, and for reasons which later appear, the cyclically-varying low-frequency energies supplied to the mixers 15A and 15B are derived from a common source 16.

The output of the mixer 15A therefore includes an upper sweeping sideband periodically passing through a range of frequencies higher than the upper sideband frequency $F_U$ and also a lower sweeping sideband covering a range of frequencies lower than the upper sideband frequency $F_U$. The output of the other mixer 15B also includes upper and lower sidebands sweeping ranges of frequency respectively higher and lower than the lower sideband frequency $F_L$. The operating frequency $F_M$ of oscillator 13 and the range of frequencies swept by oscillator 16 are so chosen that in each sweep cycle of the oscillator 16, the upper sweeping sideband $F_{LH}$ of frequency $F_L$ and the lower sweeping side band $F_{UL}$ of the higher frequency $F_U$ pass through a standard frequency $F_S$ which in this form of the invention corresponds with the desired operating frequency of oscillator 10.

The sweeping sideband outputs of the mixers 15A and 15B are respectively impressed upon high-Q circuit devices 18A and 18B, each sharply resonant at the standard frequency $F_S$ so that the output of each of the high-Q elements 18A–18B in each sweep cycle is a waveform or envelope whose shape corresponds with the resonance characteristic of the high-Q element. The demodulators 21A and 21B rectify the outputs of the high-Q elements 18A, 18B respectively to produce pulses whose peak values (in positive or negative sense) occur as the sweep sidebands $F_{UL}$, $F_{LH}$ pass through the resonant frequency of the high-Q devices 18A, 18B respectively disposed in channels A and B. The difference in time between these peak values in a sweep cycle of oscillator 16 depends, as will more clearly appear from discussion of Figures 2A–2C and Figures 3–3C, upon and is a direct measure of the difference between the operating frequency F of oscillator 10 and the standard frequency $F_S$, the resonant frequency of the high-Q elements 18A, 18B.

The pairs of pulses so derived from the sweeping sidebands in successive sweep cycles are impressed upon a phase-detector or phase-comparator 19 which for automatic stabilization of the frequency of oscillator 10 is of any known type producing a unidirectional output voltage varying in sense and magnitude in accordance with variation between the phase relation of the pulses applied to its input circuits. This output voltage may be applied, as by line 20, to effect stabilization of the frequency of oscillator 10 in any of various known manners, some of which are later herein specifically referred to.

Although the invention is not limited thereto, it is particularly suited for stabilization of microwave oscillators, in which event the standard frequency is most desirably a molecular resonance frequency of a gas. As more fully set forth in copending applications including Serial Nos. 5603 and 8246, many gases, including ammonia, exhibit sharp molecular resonance at one or more fixed frequencies which are not affected by ambient conditions including temperature.

For utilization of a molecularly resonant gas as a standard of frequency, a body thereof at suitably low pressure is confined in an enclosure such as a resonant cavity or section of waveguide so to form a high-Q circuit element utilizable as the standards 18A, 18B of Figure 1. As shown in the aforesaid applications, the gas chamber may have sealed windows of mica or like material transparent to microwave energy for effective inclusion of the combined bodies of gas as sharply resonant circuit elements respectively between mixer 15A and demodulator 21A in one channel of the servo-system and between mixer 15B and demodulator 21B in the other channel of the servo-system.

To give a specific example, helpful in a better understanding of the invention, it is assumed that the desired operating frequency F of the oscillator 10 is 23,870.1 megacycles which corresponds with the 3, 3 line of ammonia. In such case each of the high-Q elements 18A and 18B is a chamber for confining ammonia at suitably low pressure, for example, 0.01 millimeter of mercury so to afford sharp molecular resonance of the gas frequency standard at 23,870.1 megacycles ($F_S$). Further by way of example, the operating frequency of the oscillator 13 may be 15 megacycles, in which case the upper sideband frequency $F_U$ is 23,885.1 megacycles and the lower sideband frequency $F_L$ is 23,855.1 megacycles. Further by way of specific example, it will be assumed that the frequency of oscillator 16 sweeps a range of from 10 to 20 megacycles, and that the sweep waveform as shown in Figure 3 is sawtoothed. Thus, in each sweep cycle, as shown in Figure 3A, the upper sweep $F_{LH}$ of frequency $F_L$ increases from 23,865.1 to 23,875.1 megacycles, while at the same time the lower sweeping sideband $F_{UL}$ of frequency $F_U$ decreases from 23,875.1 to 23,865.1 megacycles. Thus, in each sweep cycle of oscillator 16, the two sweeping sidebands pass through the standard frequency $F_S$ from opposite directions and under the condition of zero frequency-deviation of oscillator 10 Figures 2A and 3A, there is time coincidence of such passages of the sweeping sidebands through the standard frequency $F_S$ of 23,870.1 megacycles.

In the foregoing sweep operation, two other sidebands also occur. The lower sweep $F_{LL}$ of frequency $F_L$ decreases from 23,845.1 to 23,835.1 megacycles while at the $F_U$ increases from 23,895.1 to 23,905.1 megacycles. However, since neither of these sweep intervals passes through the standard frequency $F_S$, there is no steep voltage-frequency characteristic and neither of these two sidebands contributes anything to the output or operation.

When, however, as shown in Figure 2B, the operating frequency F of oscillator 10 has drifted to the value higher than the standard frequency $F_S$, the upper sweeping sideband $F_{LH}$ of the frequency $F_L$ passes through the standard frequency $F_S$ ahead of the lower sweeping sideband of frequency $F_U$ in each sweep cycle. This is graphically illustrated in Figure 3B.

When, on the other hand, the frequency F oscillator 10 drifts to a value lower than the standard frequency $F_S$, as shown in Figure 2C, the lower sweeping sideband of frequency $F_U$ passes through the standard frequency in each sweep cycle before the upper sweeping sideband of frequency $F_L$ does: this is graphically illustrated in Figure 3C.

From the foregoing discussion of Figures 2A to 2C and 3–3C, it should be understood that the phase or time relation between the pulses produced by demodulation of the outputs of the high—Q devices 18A and 18B varies in sense and magnitude with the frequency-deviations of oscillator 10 from the desired operating value. Such shift in phase relation can be observed by applying the pulses to an oscilloscope whose sweep frequency corresponds with the sweep frequency of oscillator 16. Using an electronic switch, or equivalent, to apply the pulses in rapid alternation to the tube, the coincidence or lack of coincidence of the pairs of pulses is evident. This type of phase-comparator can be used for manual control of the frequency of oscillator 10, the operator at more or less frequent intervals, or continuously, manually adjusting the frequency control of oscillator 10 to maintain coincidence of the pulse pairs on the oscilloscope screen. Preferably, however, the phase-comparator is of a type such as shown in copending applications Serial Nos. 4497 or 115,698 which produces a control voltage applicable to the klystron or magnetron oscillator tube, or a control tube therefor, continuously automatically to maintain the pulses of each pair in time coincidence. The sweep frequency or repetition rate of the oscillator 16 should be sufficiently high for example, 100 kc. if the Q of $F_S$ does not exceed $10^5$, for collection of the frequency-error information at time intervals short compared to drift of the frequency of oscillator 10 and also should be high compared to any modulation of the frequency of oscillator 10 at intelligence-conveying frequencies.

Figure 4:
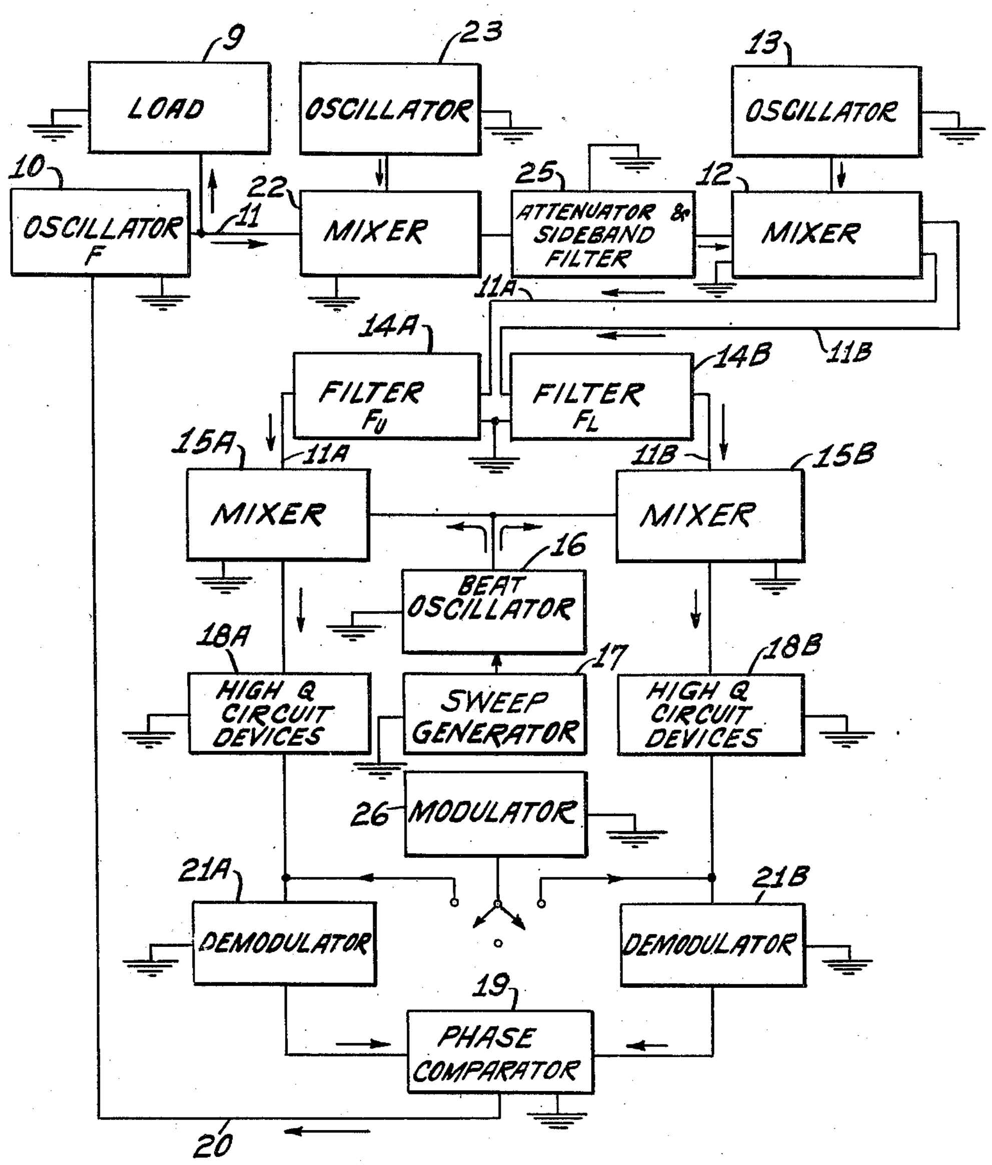
Figures 4 and 5 are block diagrams of modifications of the system of Figure 1 in which the standard frequency is offset from the desired operating frequency of the oscillator.

When the desired operating frequency F of microwave oscillator 10 does not correspond with the molecular resonant frequency of a gas but is somewhat offset therefrom, there may be utilized a system such as shown in Figure 4 in which the operating frequency of the oscillator 10 is modulated more than once to obtain the sidebands which sweep the standard frequency $F_S$. Assuming, as indicated in Figure 6, the standard frequency $F_S$ is higher than the desired operating frequency F of oscillator 10, the output of oscillator 10 may be modulated by oscillator 23 to produce in the output circuit of mixer 22 upper and lower sidebands $F_2$, $F_1$, (Figure 6) and the upper sideband-frequency $F_2$ is modulated by oscillator 13, as in the system of Figure 1, to produce sideband frequencies $F_L$ and $F_U$ respectively lower and higher than the standard frequency $F_S$. From this point on, the system of Figure 4 and the operation thereof is the same as that of Figure 1 and further description is unnecessary.

Should in the system of Figure 4, it be desired to modulate the operating frequency F of oscillator 10 for transmission of audio or video signals by a frequency-modulated carrier, this intelligence-conveying modulation may be introduced into either or both of the input circuits of phase-detector 19 beyond the filters 14A and 14B. Specifically, the output of modulator 26 may be applied to vary the phase of the output pulses of one or both of the high-Q devices 18A, 18B at speech or video frequencies. For more complete description of the principles of operation of such a modulating arrangement and for disclosure of circuits suited therefor, reference is made to copending applications Serial Nos. 135,780 and 115,698. This same method of modulation may be used in the system of Figure 1 when oscillator 10 is to be used for communication or broadcast purposes without disturbing the effectiveness of the two-channel servo-system rigidly to stabilize the mean-carrier frequency of oscillator 10.

Figures 5, 7:
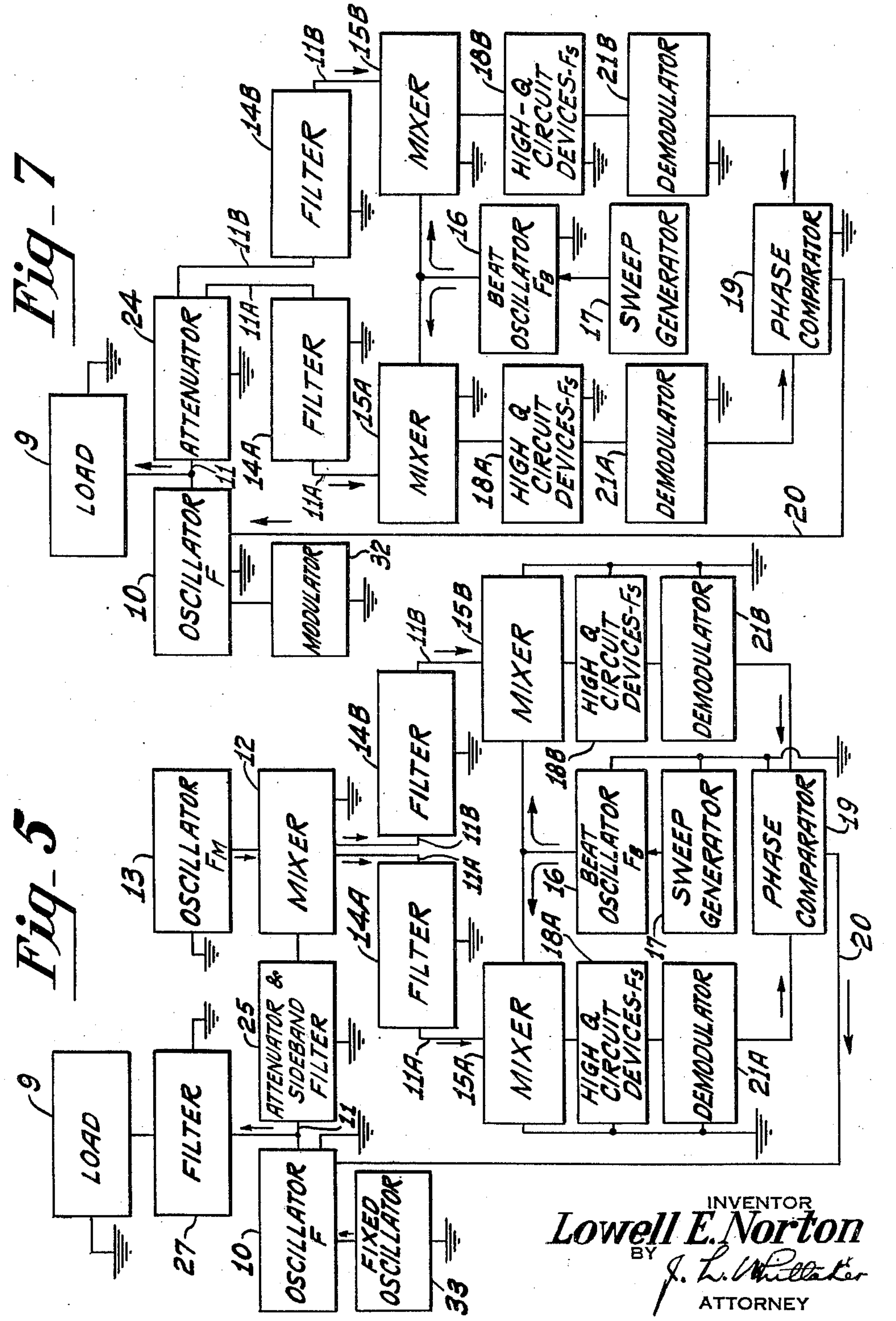
Figure 7 is a block diagram of still another modification of the invention.

In Figure 5, there is shown another arrangement for stabilizing the frequency F of an oscillator at a value offset with respect to a standard frequency $F_S$. In this case, modulation of the oscillator 10 is effected by an oscillator 33 operating at a nominally fixed frequency and which may in any known manner vary the potential of a non-linear control electrode of the oscillator tube, or of a control tube associated therewith, all as known to those skilled in the art. There is thus produced, as shown in Figure 6, upper and lower sideband frequencies $F_1$, $F_2$, one of which is modulated, as by oscillator 13, to produce the upper and lower sweeping sidebands $F_{UL}$, $F_{LH}$ which pass through the standard frequency $F_S$ in each sweep cycle. From this point on, the circuit components of Figure 5 and their operation is the same as discussed in connection with Figure 1.

If it is desired to modulate the operating frequency of the oscillator for transmission of intelligence, this may be effected as discussed in connection with Figure 4 by introducing the modulation signal into either one or both of the control channels beyond the filters 14A—14B.

In the system shown in Figure 7, the upper and lower sidebands $F_L$ and $F_U$ which are modulated by oscillator 16 to produce the sweeping sidebands, are produced by modulating the potential of a non-linear control electrode of the oscillator tube or of an associated control tube by modulator 32. As in the system of Figure 1, for example, the sideband frequencies $F_U$ and $F_L$ are selectively transmitted by the filters 14A and 14B to the mixers 15A—15B of the two channels of the servo-system. Despite the fact that in this case the upper and lower sidebands $F_L$, $F_U$ are not of fixed frequency, they nevertheless are always equally spaced at every instant from the standard frequency $F_S$. Consequently, the pairs of pulses produced by demodulation of the outputs of standards 18A, 18B are coincident in the successive sweep cycles only when there is coincidence between the mean carrier frequency of oscillator 10 and the standard frequency $F_S$, the resonant frequency of the high-Q circuit devices 18A and 18B. When there is deviation from the desired operating frequency, the shift in phase relation of the pulses applied to the input circuits of detector 19 causes the output voltage thereof correspondingly to vary and so return the oscillator frequency to the desired value.

In this, as in all of the other systems herein disclosed, the method and system is particularly suited for stabilization of the frequency of microwave oscillators with respect to the molecular resonant frequency of a gas. For microwave operation, the mixers and demodulators are preferably of the crystal rectifier type, the circuit connections 11, 11A, 11B between the microwave components of the system are waveguides or concentric lines and filters 14A, 14B and attenuator 24 are of known types suited for operation at microwave frequencies.

From the foregoing discussion and specific examples, it shall be understood the invention is not limited to the particular arrangements shown and that changes and modifications may be made within the scope of the appended claims.

What is claimed is:

1. The method of stabilizing the operating frequency of an oscillator with respect to a standard frequency which comprises modulating oscillations generated by said oscillator to produce cyclically varying sidebands respectively having mean frequencies higher and lower than said standard frequency which in a sweep cycle of said sidebands pass through said standard frequency in opposite sense, producing control signals as said sweeping sidebands pass through said standard frequency, and controlling the frequency of said oscillator in response to said control signals to maintain a fixed time relation between successive control signals in predetermined sweep cycles of said varying beat frequency.

2. The method of stabilizing the operating frequency of an oscillator with respect to a standard frequency which comprises modulating the generated oscillations at least once to produce sidebands respectively higher and lower than said standard frequency, mixing said upper and lower sidebands with a cyclically varying beat frequency to produce two sweeping sidebands which in a sweep cycle of said varying beat frequency pass through said standard frequency in opposite directions, producing a pair of pulses in each sweep cycle, each pulse occuring as one of said sweeping sidebands passes through said standard frequency, and controlling the frequency of said oscillator closely to maintain a fixed time relation between the pulses of successive pairs thereof in successive sweep cycles of said varying beat frequency.

3. The method of stabilizing the operating frequency of an oscillator at a standard frequency which comprises modulating the generated oscillations to produce sideband frequencies equally spaced above and below the oscillator frequency, mixing said sideband frequencies with a cyclically varying beat frequency to produce two sweeping sidebands which in a sweep cycle of said varying beat frequency respectively pass through said standard frequency from opposite directions producing in each of said cycles a pair of pulses each occurring as one of said sweeping sidebands passes through said standard frequency, and controlling the frequency of said oscillator closely to maintain coincidence of the pairs of pulses in successive sweep cycles of said varying beat frequency.

4. The method of stabilizing an oscillator at an operating frequency offset from a standard frequency which comprises modulating the generated oscillations to produce upper and lower sidebands, modulating one of said sidebands to produce a second pair of sidebands of frequencies respectively higher and lower than said standard frequency, mixing said second sideband frequencies with a cyclically varying beat frequency to produce two sweeping sidebands which in a sweep cycle of said varying beat frequencies respectively pass through said standard frequency from opposite directions, producing in each of said cycles a pair of pulses each occurring as one of said sweeping sidebands passes through said standard frequency, and controlling the frequency of said oscillator to maintain coincidence of the pairs of pulses in successive sweep cycles of said varying beat frequency.

5. The method of stabilizing an oscillator at an operating frequency offset from a standard frequency which comprises modulating the input of the oscillator to produce upper and lower sidebands, modulating one of said sidebands to produce a second pair of sidebands whose frequencies are respectively higher and lower than said standard frequency, mixing said second sideband frequencies with a cyclically varying beat frequency to produce two sweeping sidebands which in a sweep cycle of said varying beat frequency respectively pass through said standard frequency from opposite directions, producing in each of said cycles a pair of pulses each occurring as one of said sweeping sidebands passes through said standard frequency, and controlling the frequency of said oscillator closely to maintain coincidence of the pairs of pulses in successive sweep cycles of said varying beat frequency.

6. The method of stabilizing at a standard frequency the mean-carrier frequency of an oscillator which is modulated for transmission of intelligence which comprises mixing upper and lower sidebands produced by aforesaid modulation with a beat frequency which cyclically varies at supermodulation frequency to produce two sweeping sidebands which in a sweep cycle of said beat frequency respectively pass through said standard frequency from opposite directions, producing in each of said cycles a pair of pulses each occurring as one of said sweeping sidebands passes through said standard frequency, and controlling the frequency of said oscillator closely to maintain coincidence of the pairs of pulses in successive sweep cycles of said varying beat frequency.

7. The method of stabilizing the operating frequency of an oscillator with respect to a standard frequency which comprises modulating the generated oscillations at least once to produce sidebands respectively higher and lower than said standard frequency, mixing said upper and lower sidebands with a cyclically varying beat frequency to produce two sweeping sidebands which in a sweep cycle of said varying beat frequency pass through said standard frequency in opposite directions, producing a pair of pulses in each of said cycles, each pulse occurring as one of said sweeping sidebands passes through said standard frequency, deriving from said pulses a unidirectional voltage varying in sense and magnitude with variations of the time relation between the pulses of the pairs in successive sweep cycles, and applying said voltage to said oscillator to vary the frequency thereof in sense minimizing variation of the aforesaid time relation of the pulses.

8. The method of stabilizing the operating frequency of a microwave oscillator with respect to a molecular resonance frequency of a gas which comprises modulating said oscillator to produce side-band frequencies respectively higher and lower than said molecular resonance frequency, mixing said upper and lower sidebands with low-frequency oscillations to produce a second pair of sidebands respectively higher and lower than said molecular resonance frequency, cyclically varying said low frequency to effect sweeping by said second pair of sidebands of ranges of frequency including said molecular resonance frequency, respectively impressing said sweeping sidebands upon confined bodies of said gas, demodulating the sideband energies transmitted by said bodies of gas to produce pairs of pulses occurring as said sweeping sidebands pass through said molecular resonance frequency of said gas, and controlling the frequency of said oscillator closely to maintain coincidence of the pulses of each pair in the successive sweep cycles of said low frequency.

9. The method of stabilizing the operating frequency of a microwave oscillator system at the molecular resonance frequency of a gas which comprises modulating said oscillator to produce sidebands respectively higher and lower than said molecular resonance frequency throughout the range of drift of said operating frequency, mixing said upper and lower sidebands with a cyclically varying low frequency to produce sweeping sidebands passing through said molecular resonance frequency from opposite directions in each sweep cycle, transmitting said sweeping sidebands respectively through confined bodies of said gas, demodulating the sideband energies passed by the gas to produce pairs of pulses, producing a unidirectional control voltage varying in sense and magnitude in accordance with variation of the time relation between the pulses of successive pairs thereof, and applying said control voltage to said microwave oscillator system in sense to minimize variation of aforesaid time relation.

10. A system for stabilizing the operating frequency of an oscillator with respect to a standard frequency which comprises means for modulating oscillations generated by said oscillator to produce cyclically varying sidebands respectively having mean frequencies higher and lower than said standard frequency which in a sweep cycle of said sidebands pass through said standard frequency in opposite sense, means for deriving control signals as said sweeping sidebands pass through said standard frequency, and means for controlling the frequency of said oscillator in response to said control signals to maintain a fixed time relation between successive control signals in predetermined sweep cycles of said varying beat frequency.

11. A two-channel servo-system for stabilizing the frequency of a high-frequency oscillator with respect to a standard frequency which comprises two high-Q circuit elements both resonant at said standard frequency and respectively included in said channels, means, including modulating means for said high-frequency oscillator and a low-frequency sweep oscillator, for producing sidebands respectively impressed upon said elements and sweeping the resonant frequency thereof from opposite directions in each sweep cycle, means for demodulating the outputs of said high-Q elements to produce pairs of pulses in successive sweep cycles, and a coincidence detector upon which said pairs of pulses are impressed for derivation therefrom of a frequency-control voltage for said high-frequency oscillator which varies in sense and magnitude in accordance with frequency deviations of said oscillator.

12. A system as in claim 11 in which both of the high-Q circuit elements are resonant at the desired operating frequency of the oscillator for stabilization of the oscillator frequency at the standard frequency.

13. A system as in claim 11 in which the high-Q devices are resonant at a standard frequency offset from the desired operating frequency of the oscillator and in which the modulating means comprises two modulators, one for producing upper and lower sidebands of the oscillator frequency, and the other for modulating one of said sidebands to produce sideband frequencies respectively higher and lower than the offset standard frequency.

14. A system as in claim 11 in which the modulating means thereof variably modulates the oscillator for transmission of intelligence and in which the aforesaid upper and lower sideband frequencies are respectively selected for transmission in the different channels by frequency-selective devices.

15. A system as in claim 11 in which the modulating means thereof applies a fixed frequency to produce upper and lower sidebands which continuously differ from said operating frequency of the oscillator by a fixed amount.

16. A system as in claim 11 in which an output circuit of the high-frequency oscillator includes a mixer common to said channels and in which said modulating means includes a modulator coupled to said mixer for production of sideband frequencies respectively higher and lower than the standard frequency.

17. A system for automatically stabilizing the frequency of a microwave oscillator with respect to a molecular resonant frequency of a gas comprising a coincidence detector for producing a frequency-control voltage for said oscillator which varies with variation of the timing of pulses applied to two input circuits of the detector, each of said detector input circuits including a closed chamber containing a body of said gas at low pressure, a demodulator in circuit between said chamber and said detector, a mixer in circuit in advance of said chamber, and a microwave filter in circuit in advance of said mixer, modulating means for said oscillator producing upper and lower sideband frequencies respectively selectively transmitted by said microwave filters of the respective input circuits, and means for producing a cyclically varying low frequency and impressing it upon said mixers to produce sweeping sidebands passing through said molecular resonant frequency in opposite directions in each sweep cycle whereby demodulation of the microwave energies transmitted by said bodies of gas provides pulses for said input circuits whose relative timing is a measure of the frequency deviation of said oscillator.

18. A two-channel system for producing an electrical output varying as a function of the frequency deviations of an oscillation generating system with respect to a standard frequency comprising modulating means associated with said generating system for producing upper and lower sideband frequencies respectively higher and lower than said standard frequency, a coincidence detector having two input channels including filters respectively selectively transmitting said upper and lower sideband frequencies, a pair of mixers respectively included in said channels beyond said filters for selective impression thereon of said upper and lower sideband frequencies, a low-frequency generator of cyclically varying frequency coupled to said mixers for production of sidebands sweeping in opposite directions through said standard frequency, a pair of high-Q circuit elements resonant at said standard frequency and respectively included in said channels for impression thereon of the corresponding sweeping sidebands, and a pair of demodulators in circuit between said high-Q circuit elements and said detector respectively in said input channels thereof whereby the output of said detector varies in sense and magnitude in accordance with frequency deviations of the generated oscillations.

19. A system as in claim 18 in which the output of said detector is applied to an electrode of an electronic tube of the oscillation-generating system for rigid control of the frequency of the generated oscillations.

20. A two-channel servo-system for stabilizing the frequency of an oscillation-generating system with respect to a standard frequency comprising two filters respectively included in said channels for selective transmission of frequencies respectively higher and lower than said standard frequency, two high-Q elements respectively included in said channels and sharply resonant at said standard frequency, means including at least one modulator for said oscillator for producing upper and lower sideband frequencies respectively corresponding with the transmission frequencies of said filters, means including a low-frequency oscillator of cyclically varying frequency for beating the outputs of said filters to produce sidebands respectively applied to said high-Q elements to sweep the resonant frequency thereof from opposite directions in each sweep cycle, a coincidence detector, a pair of demodulators for demodulating the outputs of said high-Q elements for impression upon said coincidence detector, and circuit means for applying the output of said detector as a frequency control for said oscillator.

21. A system for automatically stabilizing the operating frequency of an oscillator with respect to a standard frequency comprising a coincidence detector for producing a frequency-control voltage for said oscillator which varies with variation of the timing of pulses applied to two input circuits of said detector, each of said input circuits including a high-Q device resonant at said standard frequency, a demodulator between said device and said detector, a mixer in advance of said device, and a frequency-selective device in advance of said mixer, modulating means associated with said oscillator for producing upper and lower sideband frequencies respectively selectively transmitted by said frequency-selective devices of said detector input circuits, and means for producing a cyclically varying beat-frequency and impressing it upon said mixers to produce sweeping sidebands passing through said resonant frequency of said high-Q devices in opposite directions in each sweep cycle whereby said demodulators apply to said detector pairs of pulses with timing varying with the frequency deviation of said oscillator.

LOWELL E. NORTON.

No references cited.